H. MARLES.
GAITER OR PATCH FOR REPAIRING PNEUMATIC TIRES.
APPLICATION FILED MAR. 24, 1908.

928,678.

Patented July 20, 1909.

H. MARLES.
GAITER OR PATCH FOR REPAIRING PNEUMATIC TIRES.
APPLICATION FILED MAR. 24, 1908.

928,678.

Patented July 20, 1909.
2 SHEETS—SHEET 2.

UNITED STATES PATENT OFFICE.

HENRY MARLES, OF MANOR PARK, ENGLAND.

GAITER OR PATCH FOR REPAIRING PNEUMATIC TIRES.

No. 928,678.   Specification of Letters Patent.   Patented July 20, 1909.

Application filed March 24, 1908. Serial No. 422,900.

*To all whom it may concern:*

Be it known that I, HENRY MARLES, a subject of the King of England, residing in Manor Park, in the county of Essex and Kingdom of England, have invented certain new and useful Improvements in Gaiters or Patches for Repairing Pneumatic Tires, of which the following is a specification.

My invention relates to improvements in gaiters or patches for repairing cuts, holes or weak places in the outer covers of pneumatic tires, the object being to provide a simple and expeditious means for closing and strengthening such cuts, holes or weak places, more particularly in cases of emergency when means are not at hand to effect a permanent repair in the usual manner. When a cut, hole or weak place occurs in an outer cover, there is always a possibility of the inner tube bursting through at this point. To prevent this I provide a patch of suitable size, shape and flexibility, composed preferably of raw hide or leather, or a combination of such materials as rubber and canvas, which patch is intended to be inserted between the inner tube and the outer cover so as to cover the hole or weak place.

Figure 1:
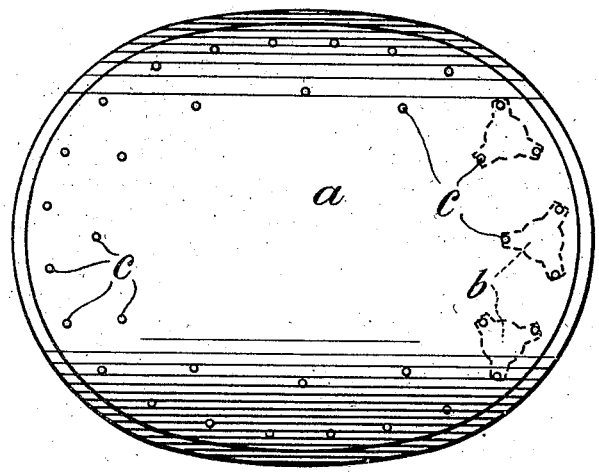
Figure 2:
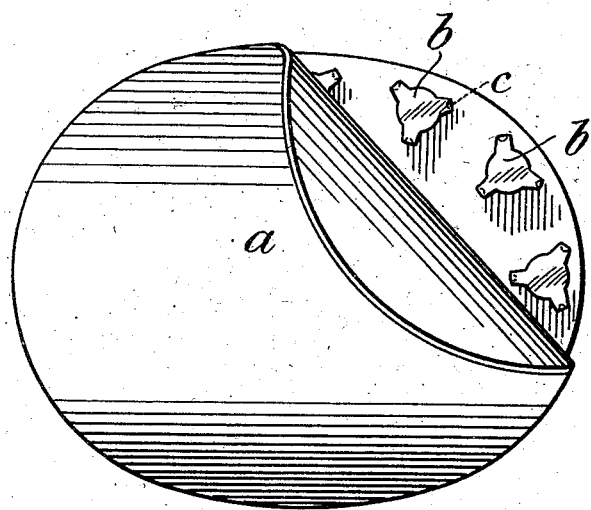
Figure 3:
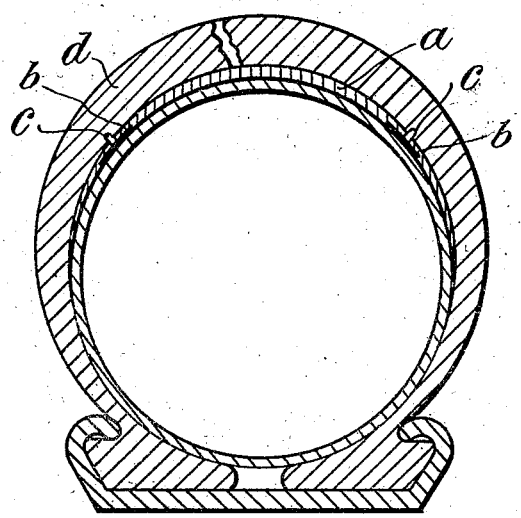

In the accompanying drawings, Figure 1 is a plan of the said patch, Fig. 2 is an underside view with part of the layer of material turned back, and Fig. 3 is a transverse section of a tire showing such a patch in position.

Referring to the drawings $a$ is the patch composed preferably of layers of raw hide, leather, canvas or rubber. Between the said layers, which are similarly solutioned together, the patch being flexible to conform to the curve where it is located, are inserted the heads $b$ of pins, points or spikes. The heads $b$ are broad, flat and rigid to prevent turning over of the pins and this peculiar formation gives them great holding power.

The metallic points or spikes $c$ penetrate the layer of the patch $a$ and when the patch is inserted in position they also penetrate the canvas lining or inner surface of the outer cover $d$ and hold the patch in position, at the same time attaching the said patch to the canvas all around the hole or weak place thus holding such parts firmly together and greatly strengthening the same. It will be seen in Fig. 1 that the spikes $c$ project from the corners or points of the triangular heads $b$ and are preferably inserted around the edge or outer portion of the patch but there might be a further ring of spikes inside those shown if desired. It will be understood that the pin head $b$ need not necessarily be triangular, so long as the head is broad and flat to give a good base. The patches could be further of various sizes and shapes to correspond with the weak place to be temporarily repaired thereby. The layer of material coming in contact with the inner tube would be of smooth canvas so as not to injuriously affect the same and the layer contacting with the inner surface of the outer cover at the part to be repaired would preferably be of rubber.

What I claim as my invention and desire to secure by Letters Patent of the United States is:—

1. A patch for repairing outer covers of pneumatic tires by insertion between the inner tube and outer cover, comprising in combination layers of flexible material solutioned together, heads located and held between the said layers, pins projecting from the said heads adapted to penetrate one or more layers of the material of the patch and also to penetrate when placed in position the inner surface of the outer cover around about the hole or weak place, thus gripping the cover and holding such parts together.

2. A patch for repairing outer covers of pneumatic tires by insertion between the inner tube and outer cover, comprising in combination layers of flexible material attached to each other, broad flat heads located and held between the said layers, a plurality of pins projecting from each of said heads adapted to penetrate some of the layers of material of the patch and to also penetrate when placed in position the inner surface of the outer cover, at points surrounding the hole or weak place, thus gripping the cover, holding such parts together and strengthening the same.

3. A patch for repairing outer covers of pneumatic tires by insertion between the inner tube and outer cover, comprising in combination layers of flexible material, broad flat triangular heads located and held between the said layers, spikes formed in one with the said heads at the corners thereof and adapted to penetrate some of the layers of material and to also penetrate when placed in position the inner surface of the outer cover at points surrounding the hole or weak place.

In testimony, that I claim the foregoing as my invention, I have signed my name in the presence of two subscribing witnesses.

HENRY MARLES.

Witnesses:
I. S. ARTHERS,
F. BLAKEY.